A. J. ADAMS.
SPRINGING OF VEHICLES.
APPLICATION FILED DEC. 20, 1917.
1,318,947.
Patented Oct. 14, 1919.
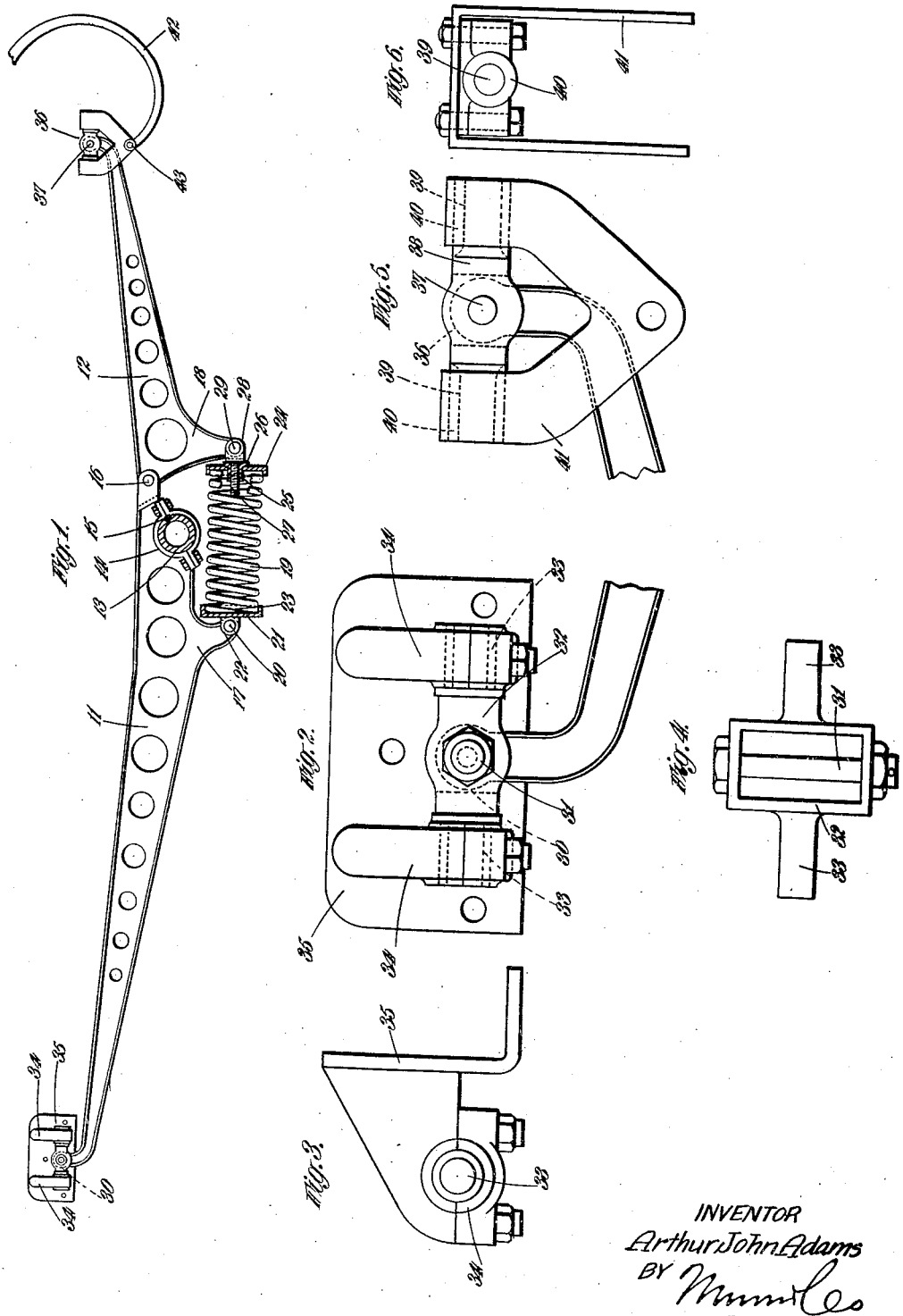
INVENTOR
Arthur John Adams
BY
ATTORNEYS

UNITED STATES PATENT OFFICE.

ARTHUR JOHN ADAMS, OF HEYWOOD, NEAR WESTBURY, ENGLAND.

SPRINGING OF VEHICLES.

1,318,947.   Specification of Letters Patent.   Patented Oct. 14, 1919.

Application filed December 20, 1917. Serial No. 208,136.

*To all whom it may concern:*

Be it known that I, ARTHUR JOHN ADAMS, a subject of the King of Great Britain, and resident of the Cottage, Heywood, near Westbury, in the county of Wilts, England, have invented a certain new and useful Improvement in the Springing of Vehicles, of which the following is a specification.

This invention relates to the springing of vehicles of various sorts, of the kind wherein the vehicle frame is attached to the axle fittings through the medium of bell-crank levers arranged longitudinally of the vehicle and attached to the usual shackles of the laminated springs which are replaced and acting on coiled springs placed in a horizontal position directly below the axle.

According to my invention, the bell-crank levers of each pair are pivoted to one another, and one of each pair is connected with the axle or axle casing (as the case may be), while their shorter arms bear against the opposite ends of one or more springs disposed, coaxially one within the other, or side by side, therebetween.

Referring to the accompanying drawings, Figure 1 is a side elevation illustrating vehicle springing in accordance with one form of this invention. Fig. 2 is a side elevation, and Fig. 3 is an end elevation of a detail, on an enlarged scale, and Fig. 4 is a plan of a part thereof. Fig. 5 is a side elevation and Fig. 6 is an end elevation of another detail, also on an enlarged scale.

The form of the invention illustrated is assumed to be for the springing of the live rear axle of a motor vehicle, and, as shown, the levers 11, 12 are of different lengths. The lever 11 serves as a radius rod and is connected with the axle casing 13 by a split bearing 14 which permits relative rotation of the axle casing 13 and the lever 11 on one side of the vehicle, while at the opposite side such relative rotation is prevented by clamping the split bearing 14 tightly to the casing 13 and by the provision of a key 15, as shown. The lever 11, thus secured to the axle casing 13, not only serves as a radius rod but also as a torque rod for the prevention of rotation of the axle casing due to the driving effort, the application of brakes, and to other causes. At its inner end the lever 11 is bifurcated and receives between its two branches the inner end of the lever 12, the two levers being pivoted together by a pin 16 passing through their inner ends. The shorter arms 17 and 18 of the levers 11 and 12 respectively, extend downward to below the level of the axle casing 13 and receive between them a coiled spring 19. For this purpose the arm 17 has pivoted thereto, by a pin 20, a thrust plate 21 provided on one side with a pair of lugs such as 22, spaced apart so as to receive between them the arm 17, and on the other side the said plate is formed with a flange 23 adapted to prevent displacement of the spring 19. At the opposite end of the spring 19 is located a flanged thrust plate 24, through a central aperture in which passes a sleeve 25 forming part of a nut 26, the head of which nut bears against the plate 24, while the nut is threaded on a bolt 27, the branches of the bifurcated head 28 of which receive between them the arm 18, which is pivoted thereto by a pin 29.

The levers 11 and 12 are connected with the vehicle frame so as to be pivotal not only on axes lying transversely of the vehicle but also on axes lying longitudinally thereof. For this purpose the outer end of the lever 11 is formed with an eye 30 through which passes a pin 31 carried by a frame 32 which is provided with trunnions 33, 33, the common axis of which lies longitudinally of the vehicle and intersects at right angles the axis of the pin 31 which lies transversely of the vehicle, preferably in the same transverse plane as the intersecting axes of the universal joint of the Cardan shaft. The trunnions 33, 33 are carried in bearings 34, 34 forming parts of a bracket 35 which is bolted or otherwise secured to the vehicle frame. The outer end of the lever 12 is formed with an eye 36 through which passes a pin 37 carried by a frame 38, similar to the frame 32, and which is provided with trunnions 39, 39 carried in bearings 40, 40 forming parts of a bifurcated bracket 41, the branches of which receive between them the end of a dumb-iron 42 to which the said bracket is pivoted by a pin 43 passing therethrough, so that the bracket 41 can swing about the pin 43 to accommodate the separation of the outer ends of the levers 11 and 12 which takes place when, for instance, an increase in the load causes said levers to be turned about the pin 16 to compress the spring 19.

Owing to the fact that relative rotation can take place between the axle casing 13 and the lever 11 at one side of the vehicle, the levers 11 and 12 on either side of the vehicle can turn about their pin 16 to compress their spring 19, to compensate for inequalities of the road, without affecting the levers 11 and 12 on the other side of the vehicle, while owing to the fact that the levers 11 and 12 on both sides of the vehicle are connected therewith by what are virtually universal joints, undue straining of the various connections is avoided.

When springing as above set forth is employed in connection with the front axle of a motor car, the levers 11 extend rearwardly, and the levers 12 extend forwardly, thereof, the levers 11 being preferably of such length that their rear ends are pivoted co-axially with the lower end of the usual bell-crank which is operated by the steering wheel to effect steering of the vehicle.

What I claim is:—

1. A springing for vehicles comprising in combination two levers arranged end to end, a single pivot pin connecting the said levers at their adjacent ends, means for attaching one of the said levers alone to a vehicle axle, a spring interposed between arms respectively projecting from each of the said levers, and universal joints at the remote ends of the levers for connecting the same to a vehicle frame, the universal joint at the remote end of that lever which alone is attached to the vehicle axle being fixed in position relatively to the vehicle frame, and the universal joint at the remote end of that lever which is not attached to the vehicle axle being movable relatively to the vehicle frame about an axis transverse of said frames.

2. A springing for vehicles comprising in combination pairs of levers arranged at opposite sides of the vehicle frame, pivot pins respectively connecting the levers of each pair, means for attaching one lever alone of each pair to a vehicle axle, a key rigidly securing to the vehicle axle one only of the said levers thus attached thereto, and springs interposed between arms projecting from each of the said levers.

3. A springing for vehicles comprising in combination two levers arranged end to end, a single pivot pin connecting the said levers at their adjacent ends, means for attaching one lever alone to a vehicle axle, a spring interposed between arms projecting from the said levers, eyes at the remote ends of the levers, pins passing through the eyes, frames carrying the pins, trunnions on the said frames arranged transversely to the said pins, bearings for the said trunnions and means for attaching the said bearings to a vehicle frame, the bearing for the trunnions on the frame carrying the pin passing through the eye at the remote end of that lever alone which is attached to the vehicle axle being fixed in position relatively to the vehicle frame, and the bearing for the trunnions on the frame carrying the pin passing through the eye at the remote end of that lever which is not attached to the vehicle axle being movable relatively to the vehicle frame about an axis transverse of said frame.

4. A springing for vehicles comprising in combination two levers arranged end to end, a single pivot pin connecting the said levers at their adjacent ends, means for attaching one lever alone to a vehicle axle, a spring interposed between arms projecting from the said levers, eyes at the remote ends of the levers, pins passing through the eyes, frames carrying the pins, trunnions on the said frames arranged transversely to the said pins, bearings for the said trunnions, and brackets on which the said bearings are carried, the bracket carrying the bearing for the trunnions on the frame carrying the pin passing through the eye at the remote end of that lever alone which is attached to the vehicle axle being fixed in position relatively to the vehicle frame, and the bracket carrying the bearing for the trunnions on the frame carrying the pin passing through the eye at the remote end of that lever which is not attached to the vehicle axle being movable relatively to the vehicle frame about an axis transverse of said frame.

5. A springing for vehicles comprising in combination two levers arranged end to end, a single pivot pin connecting the said levers at their adjacent ends, means for attaching one lever alone to a vehicle axle, a spring interposed between arms projecting from the said levers, eyes at the remote ends of the levers, pins passing through the eyes, frames carrying the pins, trunnions on the said frames arranged transversely to the said pins, bearings for the said trunnions, brackets on which the said bearings are carried, and a pivotal connection for attaching to a dumb iron the bracket carrying the bearing for the trunnions on the frame carrying the pin passing through the eye at the remote end of that lever which is not attached to the axle.

6. A springing for vehicles, comprising in combination a relatively long lever, a relatively short lever, said levers being arranged end to end, a single pivot pin connecting the said levers at their adjacent ends, means for attaching the long lever rigidly to an axle casing, arms carried by both of said levers, a spring interposed between the arms, and universal joints at the remote ends of the levers for connecting the same to a vehicle frame.

7. A springing for vehicles, comprising in combination a relatively long lever, a relatively short lever, said levers being arranged end to end, a single pivot pin connecting the said levers at their adjacent ends, means for attaching the long lever rigidly to an axle casing, arms carried by both of said levers, a spring interposed between the arms, a bracket, universal joints for connecting the ends of the levers remote from the pivot to said bracket and to the vehicle, a dumb iron and a pivotal connection between the dumb iron and the bracket.

ARTHUR JOHN ADAMS.

Copies of this patent may be obtained for five cents each, by addressing the "Commissioner of Patents, Washington, D. C."